United States Patent [19]

Jones

[11] E Re. 30,139

[45] Reissued Nov. 6, 1979

[54] SIDEARM HOLSTERS

[75] Inventor: H. Jack Jones, Orlando, Fla.

[73] Assignee: Wilma Catherine Jones, Orlando, Fla.

[21] Appl. No.: 828,160

[22] Filed: Aug. 26, 1977

Related U.S. Patent Documents

Reissue of:

[64] Patent No.: 3,904,091
Issued: Sep. 9, 1975
Appl. No.: 505,684
Filed: Sep. 13, 1974

[51] Int. Cl.[2] ..... F41C 33/02
[52] U.S. Cl. ..... 224/243; 224/911
[58] Field of Search ..... 224/2 B, 2 C; 24/211 L, 24/211 R, 201 R, 201 A

[56] References Cited

U.S. PATENT DOCUMENTS

| | | | |
|---|---|---|---|
| 1,230,043 | 6/1917 | Shelton | 224/2 B |
| 2,297,008 | 9/1942 | McMillan | 224/2 B |
| 2,349,376 | 5/1944 | Ray | 224/2 B |
| 2,551,913 | 5/1951 | Toby | 224/2 B |
| 3,113,796 | 12/1963 | Neil | 224/2 B |
| 3,200,021 | 8/1965 | Clark | 224/2 B |
| 3,718,240 | 2/1973 | Rose | 224/2 B |
| 3,762,616 | 10/1973 | Brunstetter | 224/2 B |

*Primary Examiner*—David M. Mitchell
*Attorney, Agent, or Firm*—Spencer & Kaye

[57] ABSTRACT

A sidearm holster having a latchable flap or strap composed of a spring metal strip having one end anchored in the rear part of the holster and arranged to snap upwardly when the flap is unlatched, and provided with a latching mechanism which can be manually actuated to positively unlatch the flap.

8 Claims, 4 Drawing Figures

SIDEARM HOLSTERS

Matter enclosed in heavy brackets [ ] appears in the original patent but forms no part of this reissue specification; matter printed in italics indicates the additions made by reissue.

BACKGROUND OF THE INVENTION

The present invention relates to sidearm holsters, particularly of the type having a closing strap or flap extending around the rear end, i.e. the hammer or handgrip, of a holstered sidearm.

Existing holsters of this type serve to satisfactorily hold the sidearm, but do not provide complete security against surreptitious removal of the sidearm by one other than the wearer.

Moreover, the holster flap, even when opened, tends to lie over the sidearm and to impede drawing of the weapon, as well as its return to the holster.

SUMMARY OF THE INVENTION

It is an object of the invention to reduce the possibility of removal of a sidearm from its holster without the wearer's knowledge.

More specific related objects are to render opening of the holster flap by one other than the owner more difficult and to instantly warn the wearer if the flap should open.

Another object of the invention is to cause the flap, once open, to remain out of the path along which the sidearm is drawn from the holster and returned thereto.

A further object of the invention is to provide a simple and durable structure providing such capabilities.

These and other objects of the invention are achieved by including in the flap or strap a spring strip having one end anchored in the back part of the holster to cause the flap or strap to snap up and slap the wearer's side when the strap or flap is unlatched, and by providing the holster with a latching mechanism which is manually actuable to unlatch the strap or flap.

DESCRIPTION OF THE PREFERRED EMBODIMENT

Figure 1:
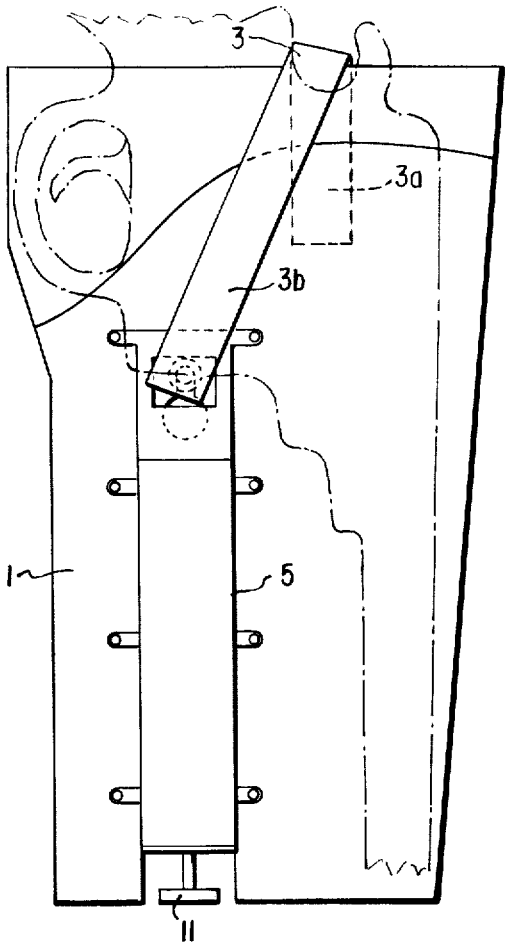
FIG. 1 is a side elevational view showing a preferred embodiment of the invention.

FIG. 1 shows a sidearm holster 1 provided with a closing strap 3 and latching mechanism 5 according to the invention. The holster 1 is designed to receive a sidearm with its barrel extending downwardly to the right of mechanism 5 and with the handgrip and trigger in the region above mechanism 5. Strap 3 passes around the hammer of the weapon.

According to one feature of the invention, strap 3 is composed of a spring steel strip having its end 3a securely anchored to the back part of the holster, this end of spring 3 being shown in broken lines. The other end 3b of strap 3 lies, when in the closed configuration, against the front part of the holster and is provided with an element arranged to cooperate with latch mechanism 5 to maintain the strap in such closed configuration, as shown in FIG. 1.

As long as the strap 3 is in the configuration shown in FIG. 1, the sidearm cannot be withdrawn from the holster.

To withdraw the holster, the wearer presses upwardly on a pushbutton 11 extending from the housing of mechanism 5. This releases strap 3 and allows it to spring upwardly, clear of the sidearm.

Since the strap is composed of, or includes, a spring steel strip, it will slap against the wearer's side at the end of its upward springing movement. Therefore, if someone other than the wearer should attempt to remove the weapon, which would require first releasing the latching mechanism, the resultant upward springing movement of strap 3 would immediately alert the wearer to the attempt.

In addition, the positive upward springing movement of strap 3 brings it to a position where it is clear of the sidearm and thus does not interfere with either withdrawal of the sidearm or its subsequent return to the holster.

Strap 3 may consist simply of a spring steel strip, or it may be composed of such a strip encased in leather or other material to match the remainder of the holster. Alternatively, the spring steel strip could be embedded in a full flap which extends across the entire width of the holster to completely cover the weapon.

While the holster is shown broken away in FIG. 1 in the region in which pushbutton 11 is located, this region can be enclosed by the front and rear parts of the holster, in which case it cannot be seen and can only be reached via an opening in the bottom surface of the holster. This form of construction provides maximum security against accidental opening of the holster flap by the wearer or unauthorized opening thereof by another. However, it also interferes with reliable rapid drawing of the weapon when desired.

Rapid drawing of the weapon can be facilitated by forming the holster parts so that the pushbutton region is open at the front and/or rear holster part, thus greatly enhancing access to the pushbutton.

Figure 2:
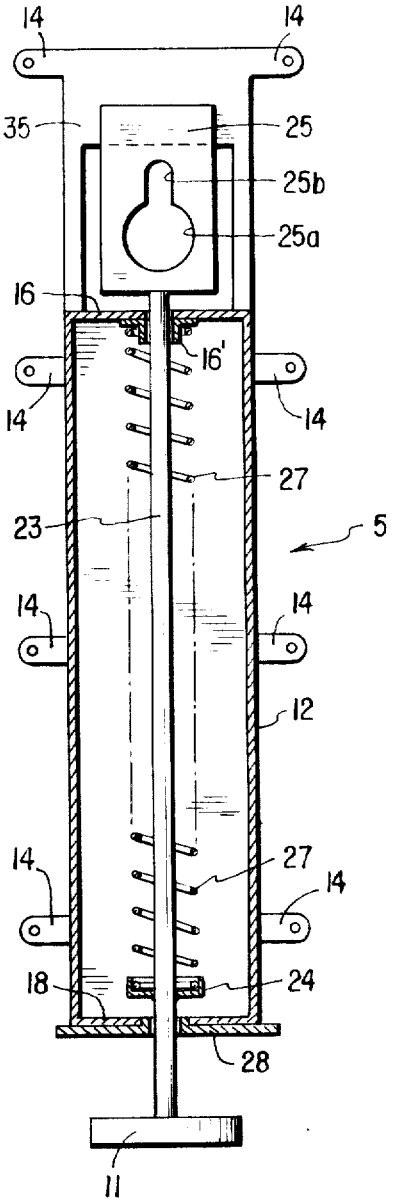
FIG. 2 is a side elevational view of the operating mechanism of the embodiment of FIG. 2.
Figure 3:
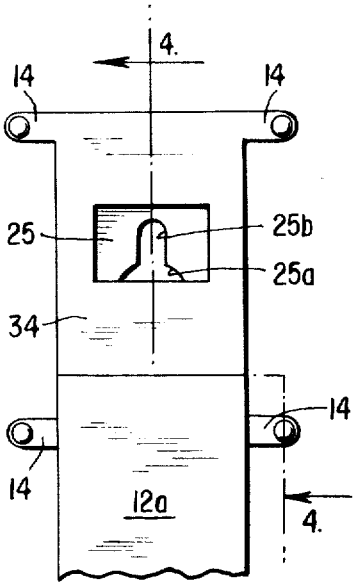
FIG. 3 is a view similar to, and in the same direction as, that of FIG. 2, showing the cover of the mechanism of FIG. 2.
Figure 4:
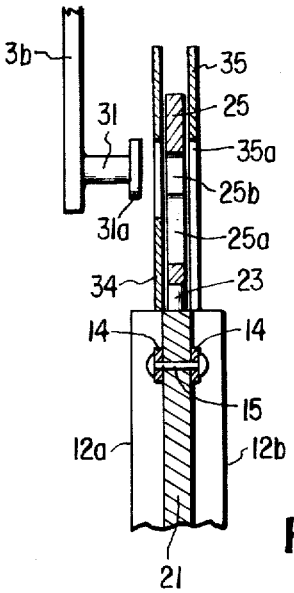
FIG. 4 is a cross-sectional view along line 4—4 of FIGS. 2 and 3.

A preferred embodiment of the strap latching system is shown in FIGS. 2–4 to include a housing 12 which can have a rectangular, circular, elliptical, or other cross section and which may be formed of two halves 12a and 12b joined together along a plane coextensive with the front part 21 of the holster. In FIG. 2, housing half 12a is removed to reveal the operating mechanism.

As is shown in detail in FIG. 4, each half may be provided with tabs 14 by which the latching mechanism is secured to the front part 21 of the holster by rivets 15 extending between opposing tabs and through the material of the holster front part 21.

There are, of course, many other techniques available for fastening the housing 12 to the holster, as by inserting the tabs through slits in the holster and bending the tabs back to cause them to grip the holster material. The housing could be of one piece and could then be fastened to the holster by only a single set of tabs, in place of the two sets depicted in FIGS. 2–4. This single set of tabs could either be riveted or crimped to the holster material, as described above. Other suitable fastening procedures, such as cementing or encasing the housing between two plies of a multiple ply material, could be employed.

Within housing 12 there is disposed an operating rod 23 extending the length of the housing and passing through aligned openings in the upper end 16 and the lower end 18 of the housing. Rod 23 carries a latching plate member 25 at its upper end and pushbutton 11 at its lower end.

Rod 23 is disposed to permit latching member 25 to be moved upwardly from a latching position to an unlatching position by upward movement of pushbutton 11.

The rod 23 is biassed downwardly into the latching position of member 25 by a helical compression spring 27 mounted around rod 23 and pressed between a circular flange 16', forming part of housing upper end 16 and surrounding the opening through which rod 23 passes, and a shoulder 24 rigidly fastened to rod 23 near housing lower end 18.

Shoulder 24 can be located along rod 23 to abut against lower end 18 when member 25 is in its lowermost position, thereby defining the latching position of member 25.

A pushbutton stop 28 fastened to housing lower end 18 serves as an abutment for pushbutton 11 and thus defines the limit of upward travel of latching member 25. Stop 28 can be mounted to permit adjustment of the location of its abutment surface.

Latching member 25 is provided with a generally keyholeshaped opening having a large diameter portion 25a and a narrow elongate portion 25b. Member 25 cooperates with a latch pin 31 having an enlarged head 31a and fastened at the free end of strip front portion 3b. The diameter of enlarged head 31a is greater than the width of elongate portion 25b but less than the diameter of portion 25a, while the diameter of the shank of pin 31 is less than the width of portion 25b.

To guide latching plate 25 during its movement between its latching and unlatching positions, housing half 12a carries a cover plate 34 and housing half 12b carried a backing plate 35. Plates 34 and 35 extend upwardly from housing upper end 16 and are spaced apart to provide a passage for latching plate member 25.

Cover plate 34 is provided with a rectangular opening for insertion of pin 31 while backing plate 35 is provided with an opening to provide complete insertion of pin 31 into the latching device. The upper edge 35a of the opening in backing plate 35 serves as an abutment surface for engaging the enlarged head 31a of pin 31 to hold the pin in position during unlatching, as will be explained below with reference to the operation of the latching mechanism.

To close the holster flap, it is pushed down by the wearer to bring pin 31 into alignment with the opening in latching plate 25. Pin 31 on strap 3 is then in the position shown in FIG. 4.

Then the wearer pushes upwardly on button 11 with one hand to bring opening portion 25a into alignment with head 31a, and pushes strap 3 with the other hand to cause head 31a to pass through opening portion 25a so that the shank of pin 31 is located in the opening in plate 25 and the enlarged head 31a is located in the opening in backing plate 35.

Then, pushbutton 11 is released to lower plate 25 so that pin 31 engages in narrow elongate opening portion 25b. Pin 31 is prevented from moving down by the lower edge of the opening in plate 34 and such downward movement could, if necessary, also be prevented by suitably locating the lower edge of the opening in backing plate 35.

To open the holster flap or strap, it is only necessary to push upwardly on button 11 to bring the large diameter portion 25a of the opening in plate 25 into alignment with enlarged portion 31a of pin 31, whereupon the pin is unlatched and strap 3 snaps upwardly, slapping the wearer's side. Any tendency of pin 31 to move upwardly with plate 25 during the unlatching operation is opposed by abutment of head 31a against edge 35a.

Embodiments of the invention can be designed to hold any type of sidearm and need only be made slightly larger than conventional holsters to accommodate the latching mechanism.

Closing and latching of the holster flap or strap involves a positive operation requiring two hands.

Mechanically, the structure and operation of the latching system according to the invention are simple and foolproof. Virtually all parts of the system can be built into the holster leather or a weatherproof housing to be protected from the elements.

The activation of the latch release mechanism is more convenient for the wearer than for other and the operating pushbutton could be concealed by the front part of the holster or could conceivably be disguised to look like a portion of the front part.

Operation of the pushbutton causes the flap or strap to instantly spring clear of the sidearm, thereby facilitating rapid drawing and easy replacement of the weapon. Because of this, the wearer will be instantly warned if someone else should operate the latching mechanism.

The invention can be applied to any type of holster, including swivel or straight holster or concealed, clip-on or harness-type holsters.

It will be understood that the above description of the present invention is susceptible to various modifications, changes and adaptations, and the same are intended to be comprehended within the meaning and range of equivalents of the appended claims.

I claim:

1. In a sidearm holster having a closing member disposed to extend over the top of a sidearm held in the holster and movable into a closed position for keeping the sidearm in the holster, and into an open position for permitting withdrawal of the sidearm, the improvement comprising:

latch means carried by said closing member near the end thereof, which, when said closing member is in its closed position, is adjacent the side of said holster which faces away from its wearer;

a manually operable latching mechanism mounted on said holster for holding said latch means when said closing member is in its closed position, said latching mechanism being manually movable *relative to said holster by direct manual actuation* into a position for releasing said latch means; and said closing member including spring means for causing said closing member to spring into its open position, and to remain therein, upon release of said latch means.

2. An arrangement as defined in claim 1 wherein said closing member is permanently connected to that side of said holster which faces the wearer when the holster is being worn, and said spring means comprise a strip of spring material joined to said closing member, having one end pemanently and immovably fastened to that side of said holster which faces the wearer when the holster is being worn, and having its opposite end disposed at a point adjacent said latch means.

3. An arrangement defined in claim 1 wherein said latching mechanism is arranged to be moved upwardly, when said holster is being worn, to reach the position in which it releases said latch means, and said latching mechanism comprises a pushbutton disposed to be pushed upwardly for moving said latching mechanism into such releasing position.

4. An arrangement as defined in claim 3 wherein said holster is provided with a recess in the vicinity of its bottom, said recess being accessible at least from the bottom of said holster and said pushbutton being located in said recess.

5. An arrangement as defined in claim 4 wherein said latching mechanism further comprises a latch plate provided with a first opening and a second opening located above said first opening and having a dimension in the direction transverse to the movement of said latching mechanism which is smaller than that of said first opening, said first and second opening being in communication, and wherein said latch means includes a latch pin extending transversely from said other end of said strip of spring material and having a shank and an enlarged head disposed at the free end of said shank, the diameter of said enlarged head being less than the dimension of said first opening in the direction transverse to movement of said latching mechanism, and larger than the corresponding dimension of said second opening, and the diameter of said shank being less than such dimension of said second opening.

6. An arrangement as defined in claim 5 wherein said latching mechanism further comprises spring biassing means arranged for urging said latching mechanism in the direction away from its said releasing position.

*7. In a sidearm holster having a closing member disposed to extend over the top of a sidearm held in the holster and movable into a closed position for keeping the sidearm in the holster, and into an open position for permitting withdrawal of the sidearm, the improvement comprising:*

*latch means carried by said closing member near the end thereof which, when said closing member is in its closed position, is adjacent one side of said holster;*

*a manually operable latching mechanism mounted on said holster for holding said latch means when said closing member is in its closed position, said latching mechanism comprising a pushbutton disposed to be manually pushed for moving said mechanism into a position for releasing said latch means; and*

*said closing member including means for causing said closing member to spring into its open position, and to remain therein, upon release of said latch means.*

*8. An arrangement as defined in claim 7 wherein said means included in said closing member are spring means.*

* * * * *